Jan. 31, 1933. S. L. HOYT 1,895,926
METHOD OF FORMING DIAMOND CHARGED CUTTING TOOL BITS
Original Filed Sept. 5, 1929

Inventor:
Samuel L. Hoyt,
by Charles E. Mullan
His Attorney.

Patented Jan. 31, 1933

1,895,926

UNITED STATES PATENT OFFICE

SAMUEL L. HOYT, OF SCHENECTADY, NEW YORK, ASSIGNOR TO GENERAL ELECTRIC COMPANY, A CORPORATION OF NEW YORK

METHOD OF FORMING DIAMOND CHARGED CUTTING TOOL BITS

Original application filed September 5, 1929, Serial No. 390,621. Divided and this application filed November 6, 1930. Serial No. 493,815.

The present application is a division of my copending application Serial No. 390,621, filed September 5, 1929, and relates to cutting or abrasive tool bits in which minute diamond or other abrasive particles are held or embedded in a matrix consisting of a sintered, hard, metal composition of the character described in Schröter reissue Patent No. 17,624 and Schröter Patent No. 1,721,416. A tool bit of this general character is described in the copending application of George F. Taylor, Serial No. 357,536, filed April 23, 1929.

It is an object of my invention to provide an improved method for forming a tool bit of the type described in the above Taylor application, into a hard, tough, compact mass suitable for use in rock drilling or in metal cutting.

According to my invention, small diamond particles are mixed with a composition of tungsten carbide and cobalt, the latter compositions being similar to that disclosed in the above Schröter patents. This mixture, or diamond charged material, is secured to a supporting member consisting of tungsten carbide and cobalt in a manner which will presently be described. The combined supporting member and diamond charged member form a tool bit which may be brazed or welded or otherwise secured to a suitable tool shank, the diamond charged material forming the cutting portion of the tool bit.

Figure 1:
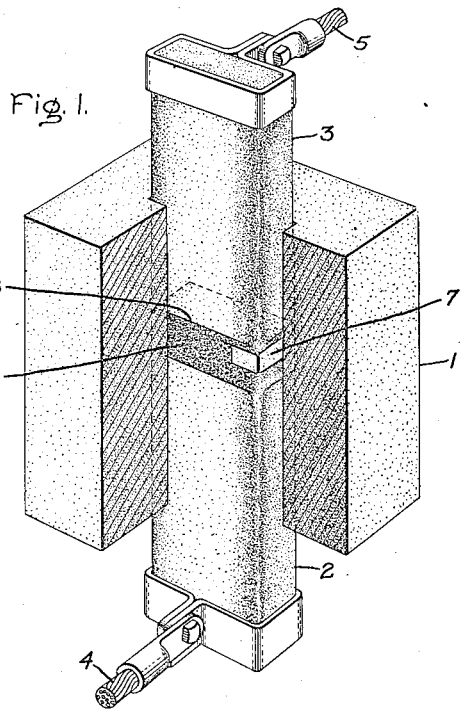
Figure 2:
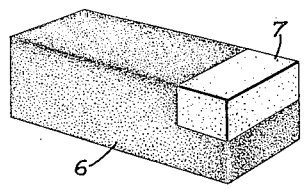

The novel features which I believe to be characteristic of my invention are set forth with particularity in the appended claims. The invention itself however will best be understood from reference to the following specification when considered in connection with the accompanying drawing in which Fig. 1 shows diagrammatically a perspective view, partly in section, of a carbon mold employed in carrying out my invention, while Fig. 2 is a perspective view of a tool bit formed in accordance with my invention.

Referring more particularly to the drawing, I have indicated at 1 a hollow carbon mold fitted with oppositely disposed carbon plungers 2 and 3 to which electrical conductors 4 and 5 may be secured in any suitable manner. A mixture of tungsten carbide and cobalt in the proportion of about 13% cobalt to 87% tungsten carbide and in an amount sufficient to form a supporting member of desired proportions is placed on the plunger 2. Pressure is applied to the mixed powdered materials to compact them slightly into the mass 6. An upper end portion of the compacted mass is then cut away or removed and a mixture 7 of small diamond particles or dust, tungsten carbide and cobalt, in the proportion of about one part by weight diamond powder to about 10 to 13 parts by weight of tungsten carbide and cobalt is placed in the cut away portion of the supporting member or mass 6. This diamond charged material is slightly compressed until its upper surface is substantially in alignment with the upper surface of the supporting member 6. A layer 8 consisting of tungsten carbide and cobalt about $\frac{1}{18}''$ thick is placed on top of the supporting member 6 and the diamond charged material 7, as indicated in Fig. 1, and pressure equal to about 1000 pounds per square inch is applied to the materials while they are simultaneously heated to a temperature in the neighborhood of 1350° C., the latter being the sintering temperature of the tungsten carbide and cobalt composition.

The layer 8 protects the diamond charged material from deterioration during the pressing operation. It forms a hard thin brittle skin on the top of the tool bit. This skin is later removed by grinding, producing the tool bit shown in Fig. 2. The provision of the layer 8 avoids the necessity of cutting away any portion of the more expensive diamond charged material.

The finished tool bit may be welded or secured in any suitable manner to a tool shank.

The supporting member 6 is cemented tungsten carbide, i. e., the cobalt acts as a cement for the tungsten carbide particles. The supporting member itself is almost as hard as a diamond but in the present instance it acts as the cementing or binder agent for the diamond particles.

The cemented tungsten carbide is particularly adapted for use as a support member since it has the same pressing, shrinking and sintering characteristics as the diamond charged material. The cemented tungsten carbide, furthermore, has sufficient strength to act as a support member and does not adversely affect the composition of diamond charged material at the high temperature employed in the hot pressing process.

The amount of tungsten carbide and cobalt employed in the supporting member 6 is substantially identical with the amount of tungsten carbide and cobalt employed in the surface layer 8, i. e., the cobalt varies from a few per cent to about 25%, the remainder being tungsten carbide.

The diamond particles may vary in size depending upon the work to be performed but should be as large or larger than the particles of the cemented tungsten carbide matrix in which they are embedded. It will be found that diamond dust or powder which will pass a 40 to 100 mesh will give satisfactory results.

What I claim as new and desire to secure by Letters Patent of the United States, is:

1. The method of forming a cutting tool bit which comprises forming a powdered matrix under pressure into a bar, cutting away an end portion of said bar, inserting into said cut-away portion a powdered composition consisting of a matrix containing a substantial amount of a hard abrasive material and applying pressure and heat to said powdered composition and bar to form them into a cutting tool bit.

2. The method of forming a cutting tool which comprises mixing tungsten carbide and cobalt with diamond particles, applying a relatively thin protective layer of tungsten carbide and cobalt above said mixture, simultaneously heating said layer and mixture to the sintering temperature of said layer and thereafter removing at least that portion of said protective layer adjacent the cutting edge of the tool.

3. The method of making a cutting tool which comprises forming a powdered mixture of tungsten carbide and cobalt into a bar, cutting away an end portion of the bar, inserting into said cut-away portion a powdered composition consisting of diamond particles embedded in a matrix of said powdered materials and applying pressure and heat to said assembled powdered materials.

4. The method of manufacturing a tool having a cutting edge portion, which comprises placing a powdered mixture comprising the ingredients of the tool in a mold, covering said mixture with a protective layer of powdered material, applying pressure to said mixture and layer, sintering said mixture and layer and thereafter removing at least that portion of said protective layer adjacent the cutting edge of the tool.

In witness whereof, I have hereunto set my hand this 31st day of October, 1930.

SAMUEL L. HOYT.